United States Patent [19]
Jeffery et al.

[11] Patent Number: 5,456,836
[45] Date of Patent: Oct. 10, 1995

[54] HIGH-EFFICIENCY, SELF-SUPPORTING FILTER ELEMENT MADE FROM FIBERS

[75] Inventors: Andrew B. Jeffery, Clifton Park, N.Y.; George Bakis, West Roxbury; John Skelton, Sharon, both of Mass.

[73] Assignee: Albany International Corp., Albany, N.Y.

[21] Appl. No.: 202,957

[22] Filed: Feb. 28, 1994

Related U.S. Application Data

[63] Continuation-in-part of Ser. No. 951,170, Sep. 25, 1992, Pat. No. 5,290,502.

[51] Int. Cl.$^6$ ............................................. B01D 46/24
[52] U.S. Cl. ............................................. 210/505; 210/508
[58] Field of Search ......................... 210/503, 504, 210/505, 506, 507, 508, 490

[56] References Cited

U.S. PATENT DOCUMENTS

| | | | |
|---|---|---|---|
| 2,354,022 | 7/1944 | Hubert et al. | 210/505 |
| 2,396,712 | 3/1946 | Luttge et al. | 264/DIG. 71 |
| 3,015,367 | 1/1962 | Smith et al. | 264/122 |
| 3,246,767 | 4/1966 | Pall et al. | 210/505 |
| 3,251,475 | 5/1966 | Till et al. | 210/503 |
| 3,381,070 | 4/1968 | Sublett et al. | 264/122 |
| 4,018,862 | 4/1977 | Saito | 264/122 |
| 4,195,112 | 3/1980 | Sheard et al. | 264/122 |

FOREIGN PATENT DOCUMENTS

| | | |
|---|---|---|
| 5434475 | 3/1979 | Japan. |
| 8101719 | 6/1983 | Japan. |
| 2104764 | 4/1990 | Japan. |

*Primary Examiner*—Frank Spear
*Attorney, Agent, or Firm*—Kane, Dalsimer, Sullivan, Kurucz, Levy, Eisele & Richard

[57] ABSTRACT

A self-supporting filter element is produced from a precursor fiber web according to one of several methods. The precursor fiber web contains heat-shrinkable fibers or binder fibers or both. The web is exposed to temperatures sufficiently elevated to cause shrinkage of the fibers or melting of the binder. After cooling the web, the filter elements produced are self-supporting, and may have densities up to 500 kg/m$^3$ to improve filtration while retaining good functional characteristics for operating pressure drop and air permeability. The self-supporting filter elements can be constructed of one material, and thus may be suitable for recycling.

14 Claims, 3 Drawing Sheets

HIGH-EFFICIENCY, SELF-SUPPORTING FILTER ELEMENT MADE FROM FIBERS

CROSS-REFERENCE TO RELATED APPLICATION

This is a continuation in part application based upon U.S. patent application Ser. No. 07/951,170, entitled "Method of Making a Rigidized Fiber Filter Element" and filed Sep. 25, 1992, now U.S. Pat. No. 5,290,502.

BACKGROUND OF THE INVENTION

1. Field of the Invention

The present invention relates to filter elements used to remove particulate matter from fluid streams. Specifically, the present invention is a high-efficiency, self-supporting filter element made from fibers.

2. Description of the Prior Art

One of the oldest and most reliable methods for separating dispersed particles from a dispersing fluid is the use of porous media in the form of a textile. A typical application is the filtering of fly ash from a gas stream from the burning of coal for power generation before the stream exits from the stack. New regulations for particulate emissions have highlighted deficiencies in conventional fabrics that can be overcome by innovative textile fiber and fabric developments.

The specification for a good filter medium is based on particle retention at an acceptable efficiency and an acceptable life in the filtering environment. The most important decision behind the success of a filtration operation is often the selection of the filter medium. For gas filtration, the medium selection involves the optimization of resistance to flow, resistance to chemical attack, ability to discharge the cake (aggregated particles on the upstream side of the filter) easily and cleanly, resistance to mechanical wear and minimum cost.

Nonwoven fabrics made from fibers are able to meet these criteria for many industrial applications. Flow resistance can be minimized through the right combination of air permeability, pore size and pore size distribution values in the fabric. Textile fibers are available in a wide variety of materials for most filtration environments. To facilitate the release of particles, the surface of a textile may be modified to remove fiber ends that otherwise hold onto particles.

Industrial gas cleaning applications are increasingly using pulse cleaned filters of needlefelt nonwoven fabrics formed into tubes and supported on wire frames. Pulsing is used to periodically clean the filter elements to restore their air permeability to some optimum value. The cleaning itself can contribute to premature fabric failure, often as a consequence of the means used to mount the bag-shaped filter elements. Such means include wire frames, rings and other fabric support hardware, all usually made of metal. These rigid structures over which the fabric filter elements are repeatedly flexed eventually cause the filter elements to abrade and tear, producing holes that necessitate replacement of the filter element. Filter cages in poor condition can also lead to increased abrasion and failure of the filter fabric. There have been many novel devices designed to reduce flexing and abrasion ranging from pulse diffusers to mesh fabrics that give additional support to the filter fabric. Pulsing and pulse pressures have been studied to improve cleaning and fabric wear.

Filtration efficiency is increasingly becoming the most important factor in the selection of a filter medium. The requirement for fine particle filtration is necessary to comply with environmental regulations. Fine particles with aerodynamic diameters of less than 10 micrometers are difficult to collect with conventional needled filter fabrics. Fine particulate material in a gas stream can lead to clogging of needlefelt fabric structures that can increase pressure drop to unacceptably high levels. High pressure drops necessitate more frequent cleaning, and, as a consequence, lead to increased mechanical wear on the fabric. The efficiency may be improved by laminating or coating the needled fabric surface with a fibrous or polymeric membrane. This is an extra and often costly manufacturing step.

Accordingly, the provision of a rigidized fiber filter element that is self-supporting and does not require supporting hardware would represent a significant advance to fabric filter technology. A rigidified fiber filter element would have the added benefit of being easily replaceable by filter elements of a different size. The length, cross-sectional area and shape could be changed to alter the filter area or performance characteristics as demands on the filter are revised. Another significant advantage would be that the efficiency of the rigidized fiber filter element would be greater than that of a conventional fabric due to the density of the fiber assembly in the fibrous structure. The rigidified fiber filter element would achieve a reduction in mechanical wear and an increase in efficiency, while retaining the advantages inherent in fiber and textile technology. Precursor fabrics could be made by any textile fiber processing method.

Filter elements constructed of a single material only may be disposed of more easily. Lack of a supporting frame would simplify the breaking apart and compression of the element for disposal. An element consisting of a single material may be suitable for recycling or incineration as a means of disposal.

SUMMARY OF THE INVENTION

The present invention is a high-efficiency, self-supporting filter element suitable for use in fabric filters and cartridge filters. The filter elements, being self-supporting, do not require cages, rings and other fabric support hardware. The self-supporting nature of the present filter element results from the dense packaging and bonding of its component fibers. The filter element is readily replaceable, and can be used as original equipment in new fabric filters or as replacements in existing units.

More specifically, the present high-efficiency, self-supporting filter element comprises an assembly of fibers. The fibers in the assembly have an average size smaller than 6 denier, and the assembly has an average density greater than 225 kg/m$^3$ and less than 500 kg/m$^3$ when measured under a pressure of 10 kPa (1.45 psi). The assembly further has a flexural rigidity per unit width of 0.50 N-m to 10.0 N-m.

The production of the self-supporting filter element of the invention requires the provision of a precursor fiber structure. The precursor may take any of a number of forms, including tubular nonwoven fabrics, flat nonwoven fabrics, woven fabrics, knitted fabrics, and fabrics produced from fibers wet or dry formed onto a mandrel of desired shape. The specific fiber deniers included in the precursor fiber structure will depend upon the ultimate application, and can be chosen to optimize the density, rigidity, filtration efficiency and flow properties desired in a self-supporting filter element for a given application. The filter elements may comprise thermoplastic fibers of a synthetic polymeric resin, as well as fibers of a natural textile material, mineral or metal.

The precursor fiber structure may be rigidified and densified by various methods to produce the self-supporting filter element. For example, the precursor may be restrained around its periphery and heated to temperatures sufficient to shrink the fibers in the precursor. A rigid, flat sheet can be produced by this method. In another method, the precursor may be slipped in sleeve-like fashion onto a mandrel, and then heat-shrunk thereon.

An alternate rigidification and densification method can be used to increase the surface area per unit volume of the filter element. In this method, the precursor fabric is slipped in sleeve-like fashion onto a frame comprising a plurality of longitudinal supports. Mold segments may be used to engage the precursor simultaneously between each pair of the plurality of longitudinal supports. The entire assembly of precursor, frame and mold segments is then subjected to high temperature, causing the precursor to shrink and form the desired shape.

In still another method, the precursor fabric is placed between inner and outer shaping devices, which can heat and compress the web to produce a denser structure upon heat-shrinking.

The self-supporting filter elements of the present invention have densities which cannot be achieved in normal textile processing methods. In the prior art, densities for filter elements are typically between 200 kg/m$^3$ and 300 kg/m$^3$. Depending on the fiber diameter, this may seriously limit the filtration efficiency. The filter elements of the present invention can have densities up to 500 kg/m$^3$. At such a level, filtration efficiency may be improved without sacrificing good functional characteristics for operating pressure drop and air permeability.

The self-supporting filter elements of the present invention may also contain other material such as particles or powders which can chemically react with, act as catalysts for, or deliver material to, the fluids passing therethrough. While ordinarily those fluids will be gaseous, the present filter elements may also be used in wet filtration applications, where the fluids may be liquids.

The self-supporting filter elements of the present invention may be used in a wide variety of filtration environments, from industrial filtration with baghouses and cartridges to specialist filters for transport, building and domestic applications.

The present invention will now be described in more complete detail below, with frequent reference being made to the accompanying figures identified below.

DETAILED DESCRIPTION OF THE PREFERRED EMBODIMENT

As described above, the present invention is a high-efficiency, self-supporting filter element, which may be placed into its rigidified and densified form by one of several methods.

All methods require the provision of a precursor fiber structure. The precursor may take any of a number of forms, including tubular nonwoven fabrics, flat nonwoven fabrics, woven fabrics, knitted fabrics, and fabrics produced from fibers wet or dry formed onto a mandrel of desired shape. As noted above, the specific fiber deniers can be used to optimize the density, rigidity, filtration efficiency and flow properties of the elements for each application.

Figure 1:
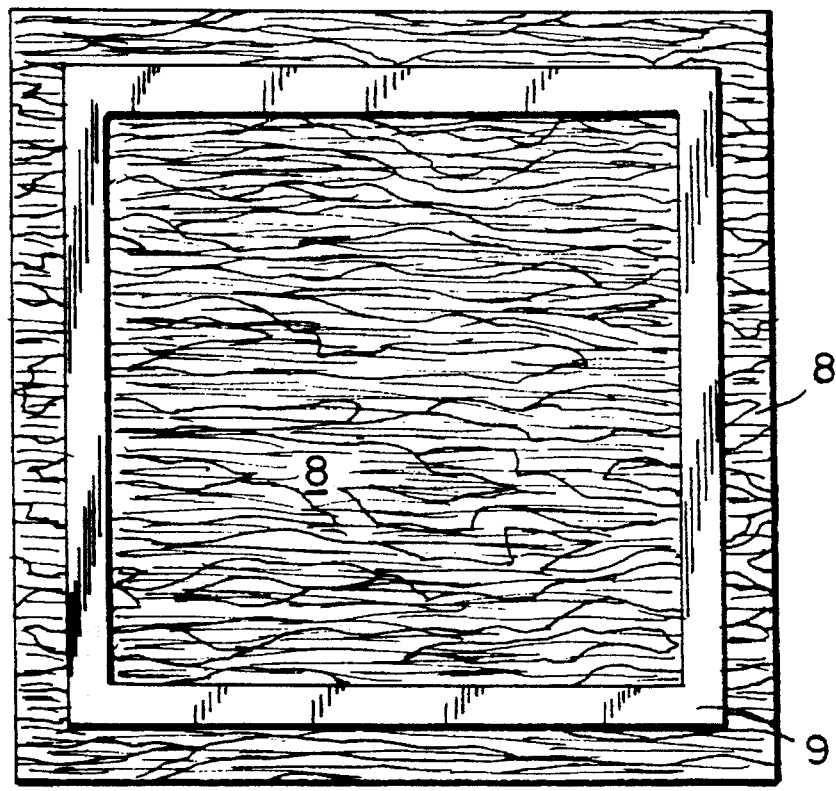
FIG. 1 shows a flat precursor fabric clamped in a restraining frame.
Figure 2:
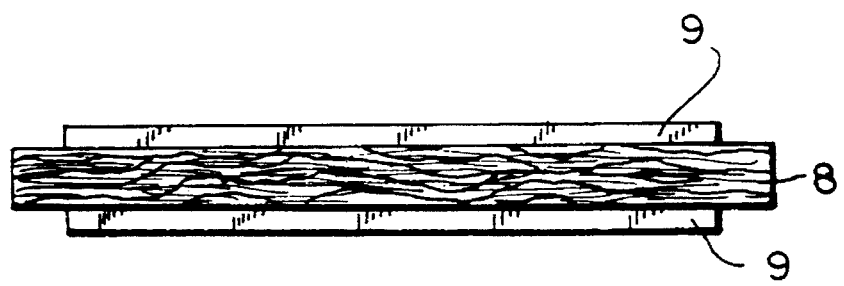
FIG. 2 is an edgewise view showing the thickness direction of the plan view provided in FIG. 1.

A first method is illustrated in FIGS. 1 and 2. FIG. 2 is an edgewise view showing the thickness direction of the plan view provided in FIG. 1. A flat precursor fabric 8 is manufactured to a size so that it can be clamped at its edges in a restraining frame 9. The flat precursor fabric 8 in the frame 9 is then exposed to an appropriate high temperature environment. The fabric 8 shrinks in the z-direction (thickness direction) while being restrained in the x- and y-directions (length and width directions). This leads to consolidation of the fabric 8 that provides the desired rigidity and density.

The degree of fabric consolidation by the edge-restrained free-shrinkage method can be controlled by manipulating the density of the flat precursor fabric 8.

Figure 3:
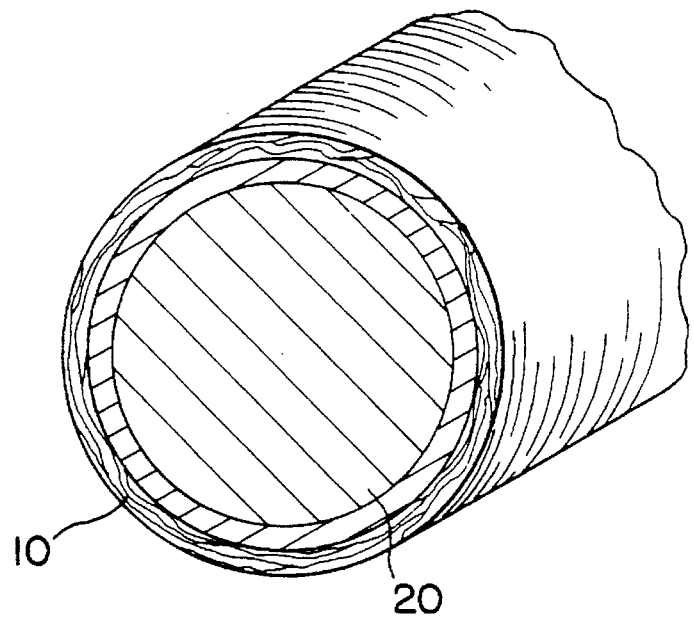
FIG. 3 shows a precursor tubular fabric positioned over a mandrel prior to being shrunk thereon.

A second method is illustrated in FIG. 3. A precursor tubular fabric 10 is manufactured slightly oversized so that it can be positioned over a mandrel 20 of suitable cross-sectional shape. The precursor tubular fabric 10 and mandrel 20 are then exposed to an appropriate high temperature environment. The fabric 10 shrinks and thereby is brought into intimate contact with the mandrel 20. While contact with the mandrel 20 prevents further shrinking so as to reduce further the diameter of the fabric 10, continued exposure to high temperature gives rise to circumferential tensions that lead to a through-the-thickness compression of the fabric 10. This, in turn, leads to a consolidation of the fabric 10 which provides the filter element with the rigidity desired.

The degree of fabric consolidation accompanying shrinkage, the extent to which a density gradient exists across the rigidized structure, and the quality of the surface finish can be controlled by manipulating the density of the precursor tubular fabric 10, by modifying the relative diameters of the precursor tubular fabric 10 and the mandrel 20, and by the thermal treatment protocol to which the fabric 10 and mandrel 20 are exposed during the rigidification process.

Figure 4:
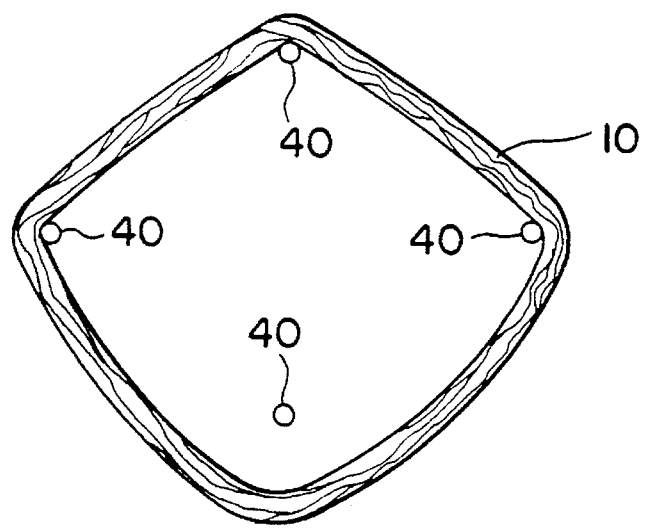
FIG. 4 shows a precursor tubular fabric positioned around a support frame.

A third method for producing the self-supporting filter element of the present invention provides it with both an increased surface area and a more rigid structure when compared to that produced by the method previously described. According to the third method, a precursor tubular fabric 10 is slipped around a support frame comprising a plurality of longitudinal supports. As shown in FIG. 4, the plurality consists of four longitudinal rods 40.

Figure 5:
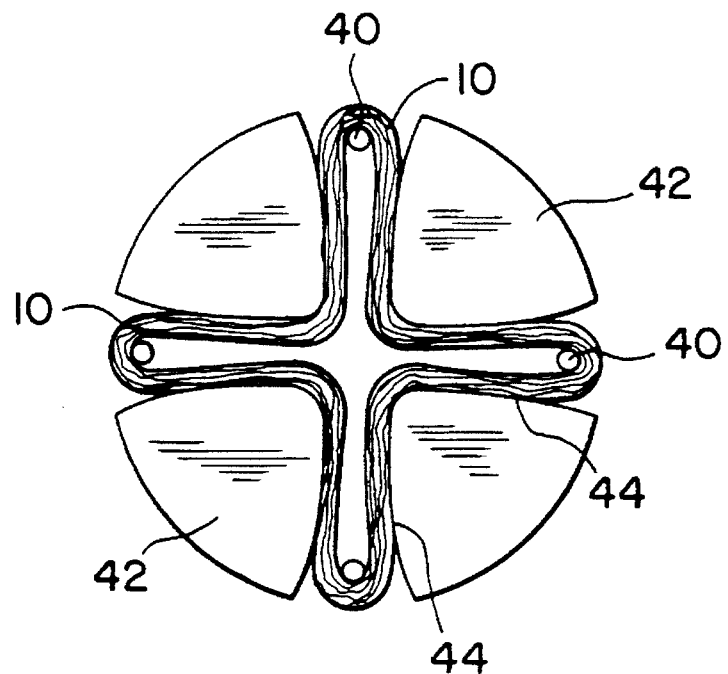
FIG. 5 shows a precursor tubular fabric on a support frame with external mold segments in position.

Next, a plurality of mold segments, each generally taking the form of a longitudinal wedge-shaped slice or a cylinder, engage the precursor tubular fabric 10 simultaneously between each pair of the plurality of longitudinal rods. In FIG. 5, four such mold segments 42 are shown, one being inserted between each pair of longitudinal rods 40. The generally radial smooth surfaces 44 of these mold segments 42 can be flat (planar) or curved (convex) or of other more complex shapes. While flat surfaces are easier to machine, convex surfaces will guarantee good interfacial contact between the outside surface of the precursor tubular fabric 10 and the surfaces 44 of the mold segments 42.

When the entire assembly of precursor tubular fabric 10, longitudinal rods 40, and mold segments 42 is subjected to high temperature, the precursor tubular fabric 10, as before, will shrink and, in so doing, will result in a self-supporting filter element. The number of mold segments used may be varied to provide the appropriate surface area and stiffness characteristics.

The cylindrical mandrel and multi-segment external mold configurations both lend themselves to continuous production processes, using the equivalent of a pultrusion die. The heated die could be shaped to provide a transition from the cylindrical precursor, made in continuous form using a Dilo needle loom, to the required final shape, and the external surface finish would be even better in this manifestation as a result of the relative motion between the part and the die.

Figure 6:
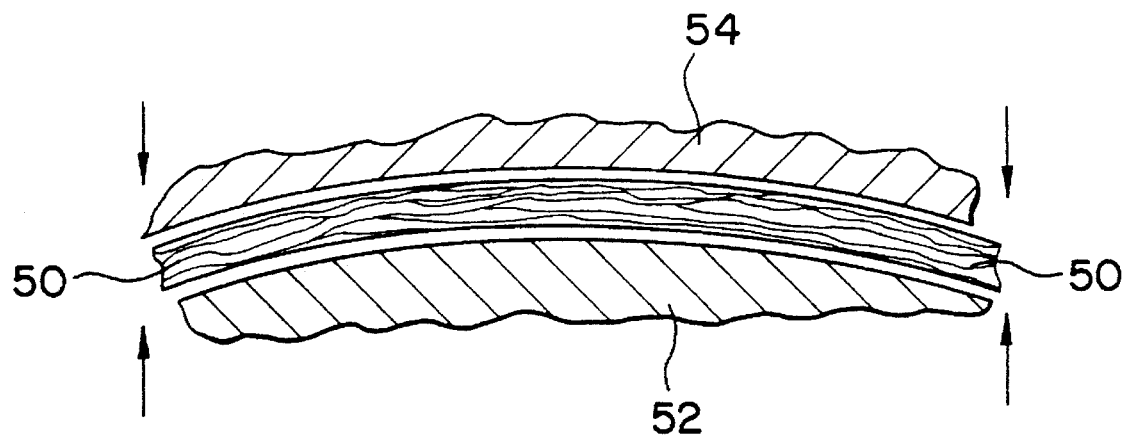
FIG. 6 shows a precursor fabric placed between inner and outer shaping devices.

According to yet another method, a precursor fabric 50, which may or may not be tubular, is placed between an inner shaping device 52 and an outer shaping device 54, which, when brought together, as suggested by the arrows in FIG. 6, may heat and compress the fabric 50 to produce a denser fabric upon heat-shrinking.

With any method of making the self-supporting filter element of the present invention, surface treatments and finishes may be applied to the filter element after the rigidification process.

The fibers used to produce the self-supporting filter element of the present invention may be of more than one variety. For example, a rigid permeable structure may be prepared from a mixture of high-shrink polyester fiber and a polyester binder fiber. The rigidity of the structure is due not only to the high-shrink fiber, but also to the binder fiber. Heating and cooling of the precursor fabric structure results in shrinkage and bonding at fiber crossover points. This further rigidifies the structure compared to that composed solely of high-shrink fiber. The density and rigidity of the fiber structure can also be increased by compression during heating.

Polyphenylene sulfide fibers may also be used to produce the self-supporting filter element of the present invention.

The self-supporting filter elements of the present invention have been made into rigid permeable structures of a range of densities and void volumes. The low-density precursor fabrics could include particulate matter within their web structure. A precursor web containing such particles could be rigidified and densified in accordance with any one of the processes described above, and the resulting reduction in void size would confine the particles within the self-supporting filter element. For example, particles of activated carbon could be incorporated within the filter element to remove toxic gases. Alternatively, the incorporation of catalyst particles could permit desired chemical reactions to occur in the fluids passing through the filter element.

A description of several examples of the self-supporting filter elements is set forth below.

EXAMPLE 1

A precursor needled nonwoven comprising 50% high shrink polyester fiber and 50% bicomponent polyester binder fiber is secured by clamping the periphery against movement. The restrained structure was heated at 120° C., allowed to cool, and released. The resulting self-supporting structure had increased in density from a starting value of 170 kg/m$^3$ to 225 kg/m$^3$.

EXAMPLE 2

A precursor hydroentangled nonwoven of the same composition as in Example 1 was secured and heated as in Example 1. The resulting self-supporting structure had increased in density from a starting value of 250 kg/m$^3$ to 300 kg/m$^3$.

EXAMPLE 3

The same nonwoven as was described in Example 1 was restrained between two flat sheets, heated to 120° C., allowed to cool and released. The resulting self-supporting rigid structure had increased in density from a starting value of 170 kg/m$^3$ to 440 kg/m$^3$.

EXAMPLE 4

A tubular nonwoven comprising 100% polyimide fiber was heated to 315° C. and allowed to shrink onto a cylindrical mandrel. After the structure was cooled and removed, it was self-supporting and rigid. The density of the structure was found to have increased from 120 kg/m$^3$ to 290 kg/m$^3$. Experimental filtration trials resulted in a very high filtration efficiency of 99.990% as compared to conventional filter bags with efficiencies of 99.90%.

EXAMPLE 5

Polyimide fibers are used in fabrics for hot gas filtration, and may be formed into rigid structures, as noted in the previous example. Needlefelt tubes were made from polyimide staple fibers, clamped over an aluminum tube and heated to temperatures between 300° C. and 330° C. Heating of the tubular needlefelt fabric resulted in shrinkage of approximately 60% and the generation of cohesive bonds between individual fibers at their contact points. Filter elements were produced with dimensions of 114 mm inside diameter and 3.0 meters in length. Densities ranged from 223 kg/m$^3$ to 352 kg/m$^3$ and thicknesses from 2.54 mm to 5.03 mm.

To evaluate the structural rigidity of polyimide rigidified fiber filter elements, an experimental rig was constructed to simulate pulse cleaning of the filter elements with repeated air pulses. Six filter bags were tested in three pairs, each pair consisting of a conventional bag with a support frame and self-supporting filter element. All bags were tested for 20,000 pulses at ambient conditions with a reservoir pressure of 552 kPa for pulsing. The rate of pulsing of once every 3 seconds was much greater than that for an operating filter so as to reduce the test duration to an acceptable time. No flexing was observed along the length of any rigid bag during pulsing, and all of the self-supporting filter elements maintained their original shape.

To evaluate the filtration efficiency of the polyimide self-supporting filter elements, two of the tubes from the pulsing test and additional new unpulsed tubes were subjected to a filtration test using fly ash from a fluidized bed boiler. Particle size for the dust test was 99.90% less than 42.35 μm and 50% less than 5.489 μm on a volume basis. Operating conditions for the filtration test were:

| | |
|---|---|
| Air-to-cloth ratio | 4 to 1 |
| Dust loading | 22.9 g/m³ |
| Cleaning mode | pulse off line |
| Filtration velocity | 1.22 m/min |
| Test duration | 100 hours |

Pressure drops for the samples stabilized at levels between 0.72 kPa and 1.18 kPa.

Filtration efficiency results for the various samples ranged from 99.967% to 99.990%.

EXAMPLE 6

Most conventional fabric filter elements are constructed of polyester or acrylic fibers that are significantly less expensive than polyimide fibers. Commercially obtained polyester fibers were used to fabricate rigidified fiber filter elements for conventional ambient filtration applications. As with polyimide precursor fabrics, the polyester precursor fabrics were subjected to heat to shrink the fibers and create cohesive bonds that resulted in rigid structures. Densities for samples produced range from 170 kg/m³ with a thickness of 3.66 mm to 450 kg/m³ with a thickness of 1.47 mm.

The structural integrity of polyester rigidified fiber filter element samples was evaluated by subjecting them to bending modulus tests together with polyimide rigidified fiber filter element samples. A comparison of polyester and polyimide samples with similar densities and basis weights showed that the polyester rigidified fiber filter element was much stiffer than those made with polyimide fiber. For example, a polyester sample with a density of 300 kg/m³ had a bending modulus of 182,385 kPa whereas a polyimide sample, similar to one used in the pulsing test with a density of 290 kg/m³ had a bending mudulus of 91,372 kPa.

Filtration tests were conducted to evaluate the filtration efficiency of the polyester rigidified fiber filter elements under conditions similar to those used to evaluate the polyimide rigidified fiber filter elements. Fly ash was used as the test dust with a particle size of 99.90% less than 32.21 μm and 50.0% less than 3.867 μm on a volume basis. Various polyester rigidified fiber filter element samples of different densities were evaluated and filtration efficiencies ranging from 99.941% to 99.974% were achieved. Pressure drops for the polyester rigidified fiber elements stabilized at levels between 1.12 kPa and 1.46 kPa. A standard polyester needlefelt was included as a control and achieved an efficiency of 99.900%. A polyimide sample similar to one that achieved an efficiency of 99.990% in the polyimide tests was included in this test and achieved an efficiency of 99.988%. The greater efficiency of the polyimide rigidified fiber filter element appears to be attributable to the high specific surface of polyimide fibers.

The self-supporting filter elements of the present invention can be produced for a wide variety of environmental conditions from ambient temperature to hot gas filtration applications. The inherent efficiency is high because of the densification of the precursor fabric that occurs during the rigidification process. The rigidified fiber filter element concept lends itself to high surface area shapes that may enable new and more compact designs for industrial filters. Fabric support hardware can be reduced or eliminated making the filter elements lighter, and disposal or recycling easier.

It should be readily understood that modifications to the above would be obvious to anyone skilled in the art without departing from the scope of the appended claims.

What is claimed is:

1. A self-supporting filter element comprising an assembly of fibers, said fibers having an average size smaller than 6 denier and said assembly having an average density greater than 225 kg/m³ and less than 500 kg/m³ when measured under a pressure of 10 kPa (1.45 psi), said assembly including a proportion of heat-shrunk fibers, which, having been heated, have shrunk to rigidity and densify said assembly to provide it with said average density, whereby said self-supporting filter element will not collapse or buckle by a pressure gradient arising in a fluid being filtered during a filtration process.

2. A self-supporting filter element as claimed in claim 1 wherein said assembly comprises thermoplastic fibers of a synthetic polymeric resin, at least 50% of said fibers being heat-shrunk fibers.

3. A self-supporting filter element as claimed in claim 1 wherein said assembly comprises thermoplastic fibers of a synthetic polymeric resin, said thermoplastic fibers including binder fibers.

4. A self-supporting filter element as claimed in claim 1 wherein said assembly of fibers includes polyimide fibers.

5. A self-supporting filter element as claimed in claim 1 wherein said assembly of fibers includes polyester fibers.

6. A self-supporting filter element as claimed in claim 1 wherein said assembly of fibers is a mixture of heat-shrunk high-shrink polyester fiber and a polyester binder fiber.

7. A self-supporting filter element as claimed in claim 1 wherein said assembly of fibers is 50% heat-shrunk high-shrink polyester fibers and 50% bicomponent polyester binder fibers.

8. A self-supporting filter element as claimed in claim 1 wherein said assembly of fibers includes polyphenylene sulfide fibers.

9. A self-supporting filter element as claimed in claim 1 wherein said assembly of fibers includes natural textile fibers.

10. A self-supporting filter element as claimed in claim 1 wherein said assembly of fibers includes mineral fibers.

11. A self-supporting filter element as claimed in claim 1 wherein said assembly of fibers includes metal fibers.

12. A self-supporting filter element as claimed in claim 1 wherein said assembly of fibers further comprises particulate matter of a chemical substance for interaction with said fluid being filtered.

13. A self-supporting filter element as claimed in claim 11 wherein said particulate matter comprises activated carbon particles.

14. A self-supporting filter element as claimed in claim 11 wherein said particulate matter comprises catalyst particles.

* * * * *